United States Patent
Nakajima

(10) Patent No.: US 11,027,577 B2
(45) Date of Patent: *Jun. 8, 2021

(54) TIRE

(71) Applicant: BRIDGESTONE CORPORATION, Tokyo (JP)

(72) Inventor: Daisuke Nakajima, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 288 days.

This patent is subject to a terminal disclaimer.

(21) Appl. No.: 16/069,061

(22) PCT Filed: Jan. 27, 2017

(86) PCT No.: PCT/JP2017/003063
§ 371 (c)(1),
(2) Date: Jul. 10, 2018

(87) PCT Pub. No.: WO2017/131212
PCT Pub. Date: Aug. 3, 2017

(65) Prior Publication Data
US 2019/0023074 A1   Jan. 24, 2019

(30) Foreign Application Priority Data

Jan. 29, 2016 (JP) .............................. JP2016-016168

(51) Int. Cl.
| | |
|---|---|
| *B60C 1/00* | (2006.01) |
| *C08L 77/06* | (2006.01) |
| *C08L 101/00* | (2006.01) |
| *C08L 23/26* | (2006.01) |
| *B60C 7/18* | (2006.01) |
| *B60C 3/04* | (2006.01) |
| *B60C 7/14* | (2006.01) |
| *B60B 3/10* | (2006.01) |
| *B60B 3/04* | (2006.01) |

(52) U.S. Cl.
CPC .................. *B60C 1/00* (2013.01); *B60B 3/04* (2013.01); *B60C 7/14* (2013.01); *B60C 7/18* (2013.01); *C08L 23/26* (2013.01); *C08L 77/06* (2013.01); *C08L 101/00* (2013.01); *B60B 3/10* (2013.01); *B60B 2360/104* (2013.01); *B60B 2900/321* (2013.01); *B60B 2900/721* (2013.01); *B60C 2001/0091* (2013.01); *B60C 2007/146* (2013.01)

(58) Field of Classification Search
CPC ....... B60C 1/00–0041; B60C 2001/005–0091; C08L 77/06; C08L 7/00–02; C08L 9/00–10; C08L 15/00–02; C08L 23/00–26; C08L 25/00–18; C08L 33/00–16; C08L 51/00–006; C08L 51/04; C08L 51/06; C08L 53/00–025; C08L 55/00–02

See application file for complete search history.

(56) References Cited

U.S. PATENT DOCUMENTS

| | | |
|---|---|---|
| 2003/0045639 A1 | 3/2003 | Iwata et al. |
| 2005/0247391 A1 | 11/2005 | Ikuta |
| 2010/0099821 A1 | 4/2010 | Soeda et al. |
| 2010/0282383 A1 | 11/2010 | Ikuta |
| 2013/0206301 A1* | 8/2013 | Fudemoto .............. B29D 30/08 152/450 |
| 2014/0251518 A1* | 9/2014 | Abe ......................... B60B 9/04 152/75 |
| 2015/0018487 A1 | 1/2015 | Sato |
| 2015/0133605 A1 | 5/2015 | Sato et al. |
| 2018/0086140 A1* | 3/2018 | Tarutani ................... C08K 7/02 |

FOREIGN PATENT DOCUMENTS

| | | | |
|---|---|---|---|
| CN | 103874589 A | | 6/2014 |
| EP | 0 839 862 A1 | | 5/1998 |
| EP | 3 409 725 A1 | | 12/2018 |
| JP | 2004-042822 A | | 2/2004 |
| JP | 2010-516835 A | | 5/2010 |
| JP | 2011-219009 A | | 11/2011 |
| JP | 2013-163517 A | | 8/2013 |
| JP | 2013-166819 A | | 8/2013 |
| JP | 2013-245318 A | | 12/2013 |
| JP | 2014-088120 A | | 5/2014 |
| JP | 2015-164849 A | | 9/2015 |
| JP | WO 2016/163425 A1 | * | 10/2016 |
| JP | 2016-199689 A | | 12/2016 |

OTHER PUBLICATIONS

International Search Report for PCT/JP2017/003063 dated Apr. 18, 2017 [PCT/ISA/210].

Communication dated Feb. 3, 2020, from The China National Intellectual Property Administration in Application No. 201780008101.5.

Communication dated Nov. 26, 2018, from the European Patent Office in counterpart European Application No. 17744442.9.

* cited by examiner

*Primary Examiner* — Ana L. Woodward
(74) *Attorney, Agent, or Firm* — Sughrue Mion, PLLC

(57) ABSTRACT

The provided tire has excellent durability regardless of use in a high-humidity environment or contact with water, even though the framework member of the tire is made of a resin material. The resin material is made of a resin composition including 60 mass % or more of a polyamide resin formed by polymerizing an aliphatic diamine having 6 to 20 carbon atoms and an aliphatic dicarboxylic acid having 10 to 20 carbon atoms.

1 Claim, 3 Drawing Sheets

TIRE

CROSS REFERENCE TO RELATED APPLICATIONS

This application is a National Stage of International Application No. PCT/JP2017/003063 filed Jan. 27, 2017, claiming priority based on Japanese Patent Application No. 2016-016168 filed Jan. 29, 2016.

TECHNICAL FIELD

The present disclosure relates to a tire.

BACKGROUND

To avoid flat tires, tires that do not need to be filled with pressurized air have been disclosed in recent years. For example, patent literature (PTL) 1 proposes a "non-air pressure tire" that includes a support structure for supporting a load from a vehicle, an optional belt layer provided on the outer circumferential side of the support structure, a tread layer provided on the outside (outer circumferential side) of the belt layer, and the like. This tire allows the support structure, which becomes a framework member, to be formed integrally from a resin material, for example. The belt layer in this "non-air pressure tire" is formed by stacking layers of steel cords or the like coated with rubber and is bonded to the outer circumferential side of the resin support structure.

CITATION LIST

Patent Literature

PTL 1: JP 2011-219009 A

SUMMARY

Technical Problem

In a regular pneumatic tire, various inputs of force such as vehicle load, running, stopping, and cornering are supported by a structure made of rubber, organic fiber cords, steel cords, air, and the like. By contrast, the majority of these inputs of force is supported by the framework member made of a resin material in the above-described type of tire. Therefore, a significant deformation strain of 1% to 10% acts on the framework member made of a resin material, making it necessary for the framework member to have greater resistance to strain input than a typical resin molded product.

Upon examination, we discovered that polyamide resins are suitable as the resin material used in this framework member, and that polyamide resins have a relatively high resistance to the aforementioned input of force that causes significant deformation. Upon further examination, however, we discovered that widely-used polyamide 6 (PA 6), polyimide 66 (PA 66), polyamide 46 (PA 46), and the like have a high water absorption rate and soften by absorbing water in a high-humidity environment, such as summer, or while it is raining. The strength, and hence the durability, may then degrade.

The present disclosure aims to provide a tire with excellent durability regardless of use in a high-humidity environment or contact with water, even though the framework member is made of a resin material.

Solution to Problem

The main features of the present disclosure for resolving the above problem are as follows.

A tire according to the present disclosure includes a framework member made of a resin material. The resin material is made of a resin composition including 60 mass % or more of a polyamide resin formed by polymerizing an aliphatic diamine having 6 to 20 carbon atoms and an aliphatic dicarboxylic acid having 10 to 20 carbon atoms.

The tire of the present disclosure has excellent durability regardless of use in a high-humidity environment or contact with water, even though the framework member is made of a resin material.

In a preferable example of the tire of the present disclosure, the resin composition further includes 40 mass % or less of a flexible component having a glass transition temperature of 0° C. or lower. In this case, the framework member can maintain good elasticity even in a low-humidity environment, and the durability of the framework member can be improved.

The flexible component preferably includes at least one selected from the group consisting of polyethylene, polypropylene, ethylene-propylene rubber, ethylene-1-butene copolymer, poly α-olefin, acrylic rubber, styrene-ethylene-butylene-styrene copolymer, and modified polymers thereof. In this case, excellent elasticity and even better durability can be obtained for the framework member of the tire.

Maleic anhydride is more preferably copolymerized with or grafted onto at least a portion of the flexible component. In this case, the elasticity and durability of the framework member of the tire are further improved.

Epoxy terminal (meth) acrylic acid ester is more preferably copolymerized with or grafted onto at least a portion of the flexible component. In this case as well, the elasticity and durability of the framework member of the tire are further improved.

In an embodiment of the present disclosure, the aforementioned tire includes an attachment body to be attached to an axle, a ring member including an inner cylinder externally covering the attachment body and an outer cylinder surrounding the inner cylinder from a tire radial outer side, a plurality of connecting members arranged along a tire circumferential direction between the inner cylinder and the outer cylinder and connecting the inner cylinder and the outer cylinder to each other, and a tread member made of vulcanized rubber and located on the tire radial outer side of the outer cylinder of the ring member. The ring member and the connecting members form the framework member and are made of the resin material. In this case, a tire with excellent durability regardless of use in a high-humidity environment or contact with water can be obtained, even though the framework member is made of a resin material.

The tire of the present disclosure is preferably a non-pneumatic tire. This tire has excellent durability regardless of use in a high-humidity environment or contact with water, even when formed as a non-pneumatic tire in which the framework member is made of a resin material.

Advantageous Effect

The present disclosure can provide a tire with excellent durability regardless of use in a high-humidity environment or contact with water, even though the framework member is made of a resin material.

DETAILED DESCRIPTION

Figure 1:
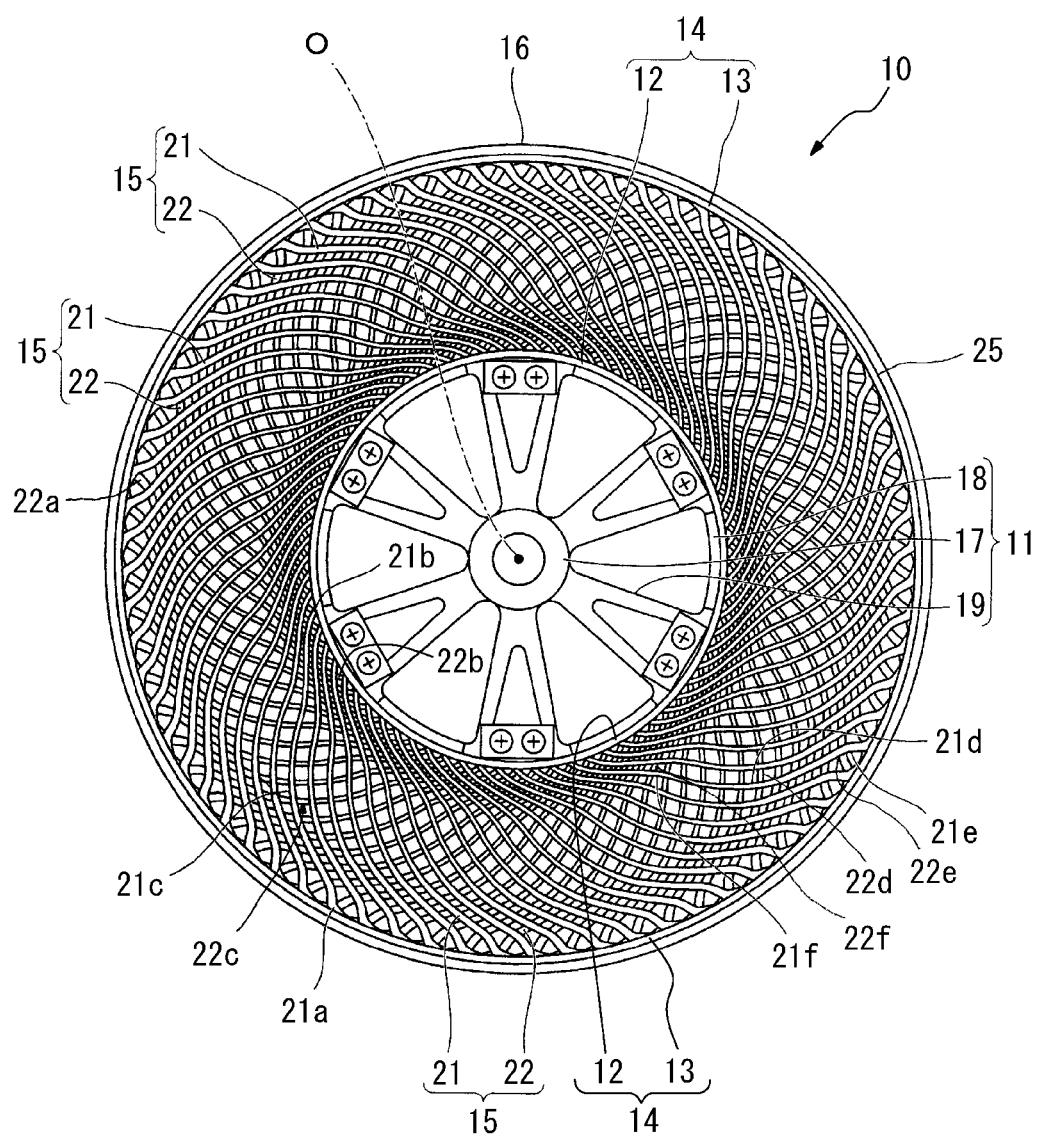
FIG. 1 schematically illustrates the structure of a non-pneumatic tire according to an embodiment of the present disclosure as seen from a tire side surface.

The tire of the present disclosure is described below in detail with reference to embodiments thereof.

The tire of the present disclosure is a tire in which the framework member is made of a resin material. Here, the framework member of the tire is a member constituting the tire framework. In greater detail, the framework member is the member that supports a rubber member from the inside towards the outside of the tire to maintain the shape of the tire tread. For example, the framework member refers to a ring member and connecting members (a spoked structure) or the like in a non-pneumatic tire.

In the present disclosure, the resin material is made of a resin composition including 60 mass % or more of a polyamide resin formed by polymerizing an aliphatic diamine having 6 to 20 carbon atoms and an aliphatic dicarboxylic acid having 10 to 20 carbon atoms. A polyamide resin formed by polymerizing an aliphatic diamine having 6 to 20 carbon atoms and an aliphatic dicarboxylic acid having 10 to 20 carbon atoms tends not to absorb water. For this reason, the water absorption rate of the framework member can be reduced by using a resin composition including 60 mass % or more of a polyamide resin formed by polymerizing an aliphatic diamine having 6 to 20 carbon atoms and an aliphatic dicarboxylic acid having 10 to 20 carbon atoms as the resin material forming the framework member. Consequently, a degradation in properties such as rigidity or strength of the framework member can be inhibited regardless of use in a high-humidity environment, such as summer, or contact with water during use in the rain. Good durability can thus be obtained in a wide range of moist environments.

If the number of carbon atoms of the aliphatic diamine used in the polyamide resin is less than 6, or if the number of carbon atoms of the aliphatic dicarboxylic acid used in the polyamide resin is less than 10, the resulting polyamide resin has high water absorbency and moreover has low flexibility. The durability of the tire in moist environments can therefore not be sufficiently increased.

On the other hand, if the number of carbon atoms of the aliphatic diamine used in the polyamide resin exceeds 20, or if the number of carbon atoms of the aliphatic dicarboxylic acid used in the polyamide resin exceeds 20, the heat resistance of the resulting polyamide resin is lowered, and the durability of the tire during normal running degrades.

Examples of the aliphatic diamine having 6 to 20 carbon atoms in the polyamide resin include 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine, 1,13-tridecamethylenediamine, 1,14-tetradecamethylenediamine, 1,16-hexadecamethylenediamine, 1,18-octadecamethylenediamine, 2,2,4-trimethyl-1,6-hexamethylenediamine, 2,4,4-trimethyl-1,6-hexamethylenediamine, 2-methyl-1,8-octamethylenediamine and the like.

Examples of the aliphatic dicarboxylic acid having 10 to 20 carbon atoms in the polyamide resin include 1,10-decanedioic acid (i.e. sebacic acid), 1,11-undecanedioic acid, 1,12-dodecanedioic acid, 1,14-tetradecanedioic acid, 1,16-hexadecanedioic acid, 1,18-octadecanedioic acid, 1,20-eicosanedioic acid, and the like.

The polyamide resin is not restricted apart from being formed by polymerizing an aliphatic diamine having 6 to 20 carbon atoms and an aliphatic dicarboxylic acid having 10 to 20 carbon atoms, i.e. apart from being a condensation polymer of an aliphatic diamine having 6 to 20 carbon atoms and an aliphatic dicarboxylic acid having 10 to 20 carbon atoms. Examples of the condensation polymer include polyamide 610 (PA610), polyamide 612 (PA612), polyamide 1010 (PA1010), and polyamide 1012 (PA1012). The polyamide resin can be synthesized by condensation polymerization of an aliphatic diamine having 6 to 20 carbon atoms and an aliphatic dicarboxylic acid having 10 to 20 carbon atoms using a known method. Commercial products may also be used, such as "Hyprolon 70NN", "Hyprolon 90NN", "Hyprolon 200NN", "Hyprolon 400NN", or the like produced by Arkema.

In the above-described result of polymerizing an aliphatic diamine having 6 to 20 carbon atoms and an aliphatic dicarboxylic acid having 10 to 20 carbon atoms, i.e. the condensation polymer of an aliphatic diamine having 6 to 20 carbon atoms and an aliphatic dicarboxylic acid having 10 to 20 carbon atoms, two amide bonds at a time are reversed in direction in the main chain, as illustrated in Formula (1) below.

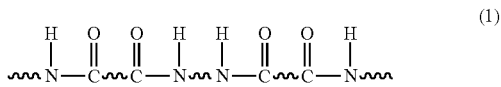

(1)

On the other hand, the amide bonds in the main chain are in the same direction in a polyamide obtained by ring-opening polymerization of lactam, as illustrated in Formula (2) below.

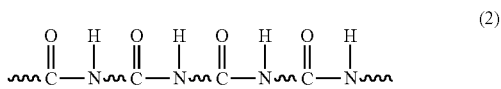

(2)

A polyamide in which two amide bonds of the main chain at a time are reversed in direction is less crystalline and has a higher degree of freedom of the molecular chain, and thus has higher mechanical strength, than a polyamide in which the amide bonds of the main chain are in the same direction. Furthermore, a polyamide in which two amide bonds of the main chain at a time are reversed in direction has a small entropy difference between the melted and crystal form and thus also has a high melting point and excellent heat resistance. Therefore, using a resin composition that includes a condensation polymer of an aliphatic diamine having 6 to 20 carbon atoms and an aliphatic dicarboxylic acid having 10 to 20 carbon atoms in the framework member can improve properties such as the rigidity and strength of the framework member and can improve durability.

The content of the polyamide resin in the resin composition is 60 mass % or more, preferably 70 mass % or more, to reduce the water absorption rate of the framework member. If the content of the polyamide resin in the resin composition used in the framework member is less than 60 mass %, the effect of reducing the water absorption rate of the framework member is insufficient, and the durability in moist environments becomes insufficient.

The resin composition used in the framework member preferably further includes 40 mass % or less of a flexible component having a glass transition temperature (Tg) of 0° C. or lower. By including a flexible component having a glass transition temperature (Tg) of 0° C. or lower in the resin composition used in the framework member, the framework member can maintain good elasticity even in a low-humidity environment, and the durability of the framework member can be improved.

Here, the flexible component refers to a component with a lower Young's modulus at 23° C. than the polyamide resin. Examples of the flexible component for obtaining excellent elasticity and durability include polyethylene, polypropylene, ethylene-propylene rubber, ethylene-1-butene copolymer, poly α-olefin, acrylic rubber, styrene-ethylene-butylene-styrene copolymer, and modified polymers thereof. Among these, the flexible component preferably includes at least one selected from the group consisting of ethylene-propylene rubber, poly α-olefin, acrylic rubber, styrene-ethylene-butylene-styrene copolymer, and ethylene-1-butene copolymer to obtain better elasticity and durability.

Furthermore, in the flexible component, maleic anhydride or epoxy terminal (meth) acrylic acid ester is preferably copolymerized with or grafted onto at least a portion of the flexible component. The flexible component with which these compounds are copolymerized, or onto which these compounds are grafted, reacts with the terminal group of a polyamide resin, and the dispersibility in the resin composition increases. The elasticity and durability of the framework member are thus further improved. Here, "(meth) acrylic acid ester" refers to acrylic acid ester and/or methacrylic acid ester.

The reason for restricting the glass transition temperature (Tg) of the flexible component, which the resin composition preferably includes at 40 mass % or less, to 0° C. or lower is to improve the durability at low temperatures. For the same reason, the glass transition temperature (Tg) of the flexible component is preferably −20° C. or lower.

The content of the flexible component in the resin composition is 40 mass % or less, preferably 30 mass % or less, and preferably 1 mass % or more. If the content of the flexible component in the resin composition is 1 mass % or more, better elasticity can be obtained even in a low-temperature environment, whereas if the content is 40 mass % or less, the strength of the framework member can be maintained sufficiently well in addition to sufficiently achieving the above-described effect of the polyimide resin.

In addition to the above-described polyamide resin and flexible component, the resin composition may include one or more additives, such as an age resistor, plasticizer, filler, or pigment.

(Non-Pneumatic Tire)

Next, a non-pneumatic tire according to an embodiment of the present disclosure is described.

Figure 2:
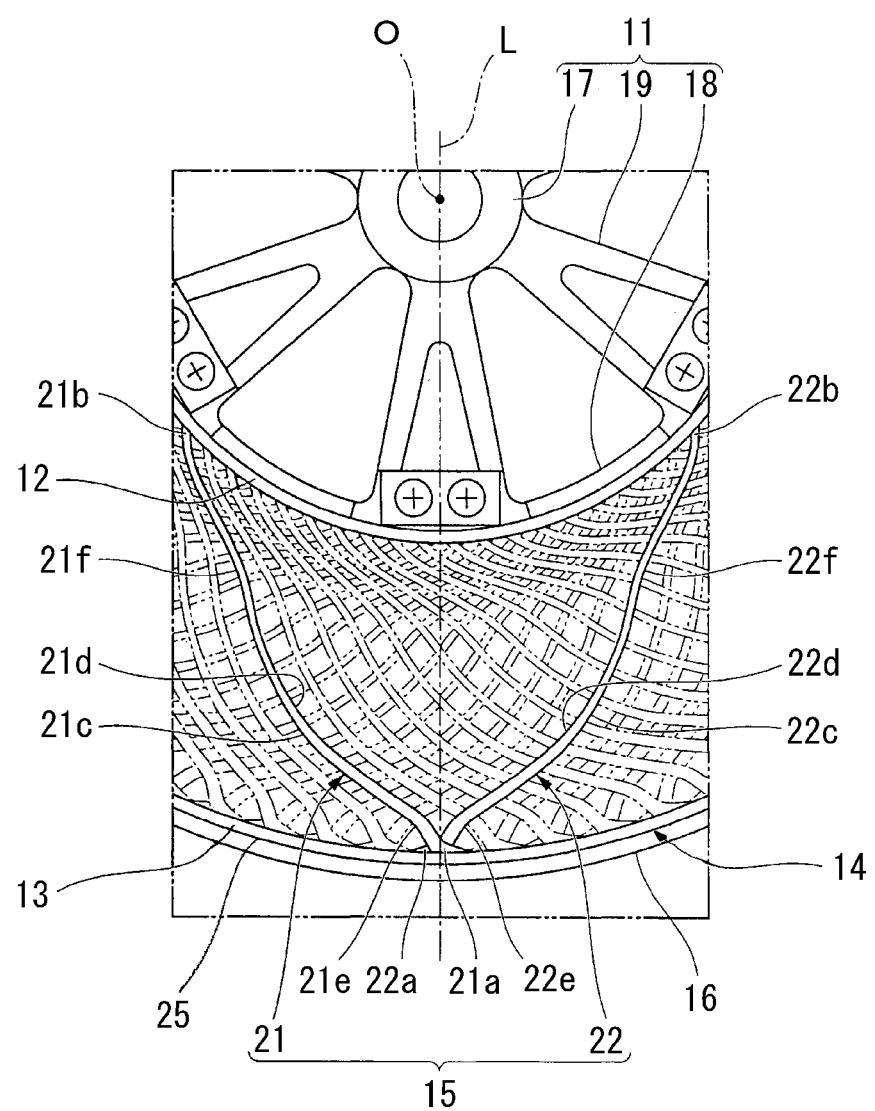
FIG. 2 is an enlarged view of a portion of the tire in FIG. 1.

FIG. 1 schematically illustrates the structure of a non-pneumatic tire according to an embodiment of the present disclosure as seen from a tire side surface, and FIG. 2 is an enlarged view of a portion of FIG. 1. For the sake of clarity, in FIG. 2, only one first elastic connecting plate 21 and one second elastic connecting plate 22 from among the below-described plurality of first elastic connecting plates 21 and plurality of second elastic connecting plates 22 are depicted with solid lines for emphasis.

As illustrated in FIGS. 1 and 2, a non-pneumatic tire 10 in the present embodiment includes an attachment body 11 to be attached to an axle (not illustrated), a ring member 14 including an inner cylinder 12 externally covering the attachment body 11 and an outer cylinder 13 surrounding the inner cylinder 12 from the tire radial outer side, a plurality of connecting members 15 arranged along the tire circumferential direction between the inner cylinder 12 and the outer cylinder 13 and connecting the cylinders 12 and 13 to each other, and a tread member 16 made of vulcanized rubber and integrally covering the outer circumference of the ring member 14.

The attachment body 11, the inner cylinder 12, the outer cylinder 13, and the tread member 16 are coaxial with a common axis and have their centers in the tire width direction coinciding with each other. The common axis is referred to as "axis O", the direction orthogonal to the axis O as the "tire radial direction", and the direction circling around the axis O as the "tire circumferential direction".

The attachment body 11 includes a holding cylindrical portion 17 in which an end of the axle is held, an outer ring portion 18 surrounding the holding cylindrical portion 17 from the tire radial outer side, and a plurality of ribs 19 connecting the holding cylindrical portion 17 and the outer ring portion 18 (see FIGS. 1 and 2).

The holding cylindrical portion 17, the outer ring portion 18, and the ribs 19 are integrally formed of a metal material such as an aluminum alloy. The holding cylindrical portion 17 and the outer ring portion 18 are each formed to be cylindrical and are arranged coaxially with the axis O. The plurality of ribs 19 are arranged at equal intervals in the circumferential direction.

Each connecting member 15 includes a first elastic connecting plate 21 and second elastic connecting plate 22 connecting the inner cylinder 12 and outer cylinder 13 in the ring member 14 to each other. A plurality of first elastic connecting plates 21 are arranged along the tire circumferential direction at one position in the tire width direction, and a plurality of second elastic connecting plates 22 are arranged along the tire circumferential direction at another position in the tire width direction different from the one position in the tire width direction. For example, a total of 60 first elastic connecting plates 21 and second elastic connecting plates 22 are provided.

In other words, the plurality of first elastic connecting plates 21 are arranged along the tire circumferential direction at the same position in the tire width direction, and the plurality of second elastic connecting plates 22 are arranged along the tire circumferential direction at the same position in the tire width direction away from the first elastic connecting plates 21 in the tire width direction.

The connecting members 15 are provided at positions that are axisymmetric with respect to the axis O, between the inner cylinder 12 and outer cylinder 13 in the ring member 14. All connecting members 15 have the same shape and the same size. The width of each connecting member 15 in the tire width direction is less than the width of the outer cylinder 13 in the tire width direction.

First elastic connecting plates 21 adjacent in the tire circumferential direction are not in contact with each other, and second elastic connecting plates 22 adjacent in the tire circumferential direction are not in contact with each other. Furthermore, a first elastic connecting plate 21 and second elastic connecting plate 22 adjacent in the tire width direction are not in contact with each other.

The first elastic connecting plates 21 and the second elastic connecting plates 22 have the same width in the tire width direction. The first elastic connecting plates 21 and the second elastic connecting plates 22 also have the same thickness in a tire lateral view.

One end 21a of the first elastic connecting plate 21 connected to the outer cylinder 13 is located more on one side in the tire circumferential direction than the other end 21b of the first elastic connecting plate 21 connected to the inner cylinder 12, and one end 22a of the second elastic connecting plate 22 connected to the outer cylinder 13 is located more on the other side in the tire circumferential direction than the other end 22b of the second elastic connecting plate 22 connected to the inner cylinder 12.

The respective ends 21a and 22a of the first elastic connecting plate 21 and second elastic connecting plate 22 differ in position in the tire width direction and are connected to the same position in the tire circumferential direction on the inner circumferential surface of the outer cylinder 13.

In the illustrated example, a plurality of curved portions 21d to 21f curved in the tire circumferential direction are formed in an intermediate portion 21c of the first elastic connecting plate 21 between the end 21a and the other end 21b, along the extending direction of the elastic connecting plate 21 in a tire lateral view of the tire 10 as seen from the tire width direction. Likewise, a plurality of curved portions 22d to 22f curved in the tire circumferential direction are formed in an intermediate portion 22c of the second elastic connecting plate 22 between the end 22a and the other end 22b, along the extending direction of the elastic connecting plate 22 in a tire lateral view of the tire 10 as seen from the tire width direction. Curved portions adjacent in the extending direction from among the plurality of curved portions 21d to 21f in the elastic connecting plate 21 are curved in opposite directions to each other, and curved portions adjacent in the extending direction from among the plurality of curved portions 22d to 22f in the connecting plate 22 are curved in opposite directions to each other.

The plurality of curved portions 21d to 21f formed in the first elastic connecting plate 21 are made up of a first curved portion 21d curved to protrude to the other side in the tire circumferential direction, a second curved portion 21e located between the first curved portion 21d and the end 21a and curved to protrude to the one side in the tire circumferential direction, and a third curved portion 21f located between the first curved portion 21d and the other end 21b and curved to protrude to the one side in the tire circumferential direction.

The plurality of curved portions 22d to 22f formed in the second elastic connecting plate 22 are made up of a first curved portion 22d curved to protrude to the one side in the tire circumferential direction, a second curved portion 22e located between the first curved portion 22d and the end 22a and curved to protrude to the other side in the tire circumferential direction, and a third curved portion 22f located between the first curved portion 22d and the other end 22b and curved to protrude to the other side in the tire circumferential direction.

In the illustrated example, the first curved portions 21d and 22d are greater in radius of curvature in a tire lateral view than the second curved portions 21e and 22e and the third curved portions 21f and 22f. The first curved portions 21d and 22d are respectively situated in center parts in the extending directions of the first elastic connecting plate 21 and second elastic connecting plate 22.

The two elastic connecting plates 21 and 22 have the same length. In a tire lateral view, the other end 21b of the elastic connecting plate 21 is connected on the outer circumferential surface of the inner cylinder 12 at a position separated by a certain angle (e.g. 20° or more and 135° or less) about the axis O toward the other side in the tire circumferential direction from the position radially opposite the end 21a, and the other end 22b of the elastic connecting plate 22 is connected on the outer circumferential surface of the inner cylinder 12 at a position separated by the same angle about the axis O toward the one side in the tire circumferential direction from the position radially opposite the end 22a, as illustrated in FIG. 2. In the first elastic connecting plate 21 and the second elastic connecting plate 22, the first curved portions 21d and 22d protrude in opposite directions to each other in the tire circumferential direction and have the same size, as do the second curved portions 21e and 22e and the third curved portions 21f and 22f.

Thus, the shape of each connecting member 15 in a tire lateral view is line-symmetrical with respect to a virtual line L that extends along the tire radial direction and passes through the respective ends 21a and 22a of the elastic connecting plates 21 and 22, as can be seen from the pair of the first elastic connecting plate 21 and second elastic connecting plate 22 illustrated with emphasis by solid lines in FIG. 2.

In each of the elastic connecting plates 21 and 22, one end portion from the center part in the extending direction to the end 21a or 22a is thicker than the other end portion from the center part to the other end 21b or 22b in a tire lateral view, as illustrated in FIG. 2. This enhances the strength of the one end portion that tends to be under a heavy load in each of the first elastic connecting plate 21 and second elastic connecting plate 22, while preventing an increase in weight of the connecting member 15 and ensuring the flexibility of the connecting member 15. Here, the one end portion and the other end portion are smoothly linked together without any difference in level.

The ring member 14 may be divided at the center in the tire width direction, for example, into a one-side partial ring member on one side in the tire width direction and another-side partial ring member on the other side in the tire width direction. In this case, the one-side partial ring member may be formed integrally with the first elastic connecting plates 21, and the other-side partial ring member may be formed integrally with the second elastic connecting plates 22. The one-side partial ring member and the first elastic connecting plates 21 may be formed integrally by injection molding, and the other-side partial ring member and the second elastic connecting plates 22 may be formed integrally by injection molding.

The ring member 14 is fixed to the attachment body 11 in a state where the inner cylinder 12 is fitted onto the attachment body 11.

In the non-pneumatic tire according to an embodiment of the present disclosure, the framework member corresponds to the ring member 14 and the connecting member 15 of a non-pneumatic tire. The ring member 14 and the connecting member 15 are made of the above-described resin material, i.e. the above-described resin composition including 60 mass % or more of a polyamide resin formed by polymerizing an aliphatic diamine having 6 to 20 carbon atoms and an aliphatic dicarboxylic acid having 10 to 20 carbon atoms.

Forming the ring member 14 and the connecting member 15 from a resin material made of the above-described resin composition achieves a non-pneumatic tire with excellent durability regardless of use in a high-humidity environment or contact with water.

Furthermore, the ring member 14 and the connecting member 15 that constitute the framework member in the non-pneumatic tire according to an embodiment of the present disclosure need to be made of the above-described resin material, i.e. the resin composition, but different resin compositions may be used in the connecting member 15 and the ring member 14.

In the non-pneumatic tire 10 of the present embodiment, the tread member 16 is cylindrical and wholly covers the entire outer circumferential surface of the outer cylinder 13 of the ring member 14. The tread member 16 is made of vulcanized rubber obtained by vulcanizing a rubber composition containing natural rubber, for example, for wear resistance and the like.

An adhesion layer 25 is located between the outer cylinder 13 of the ring member 14 and the tread member 16 to mediate the bonding between the outer cylinder 13 and the tread member 16 and preferably contains a cyanoacrylate-based adhesive agent, for example.

The following describes another example of the connecting members that connect the inner cylinder 12 and the outer cylinder 13.

Figure 3A:
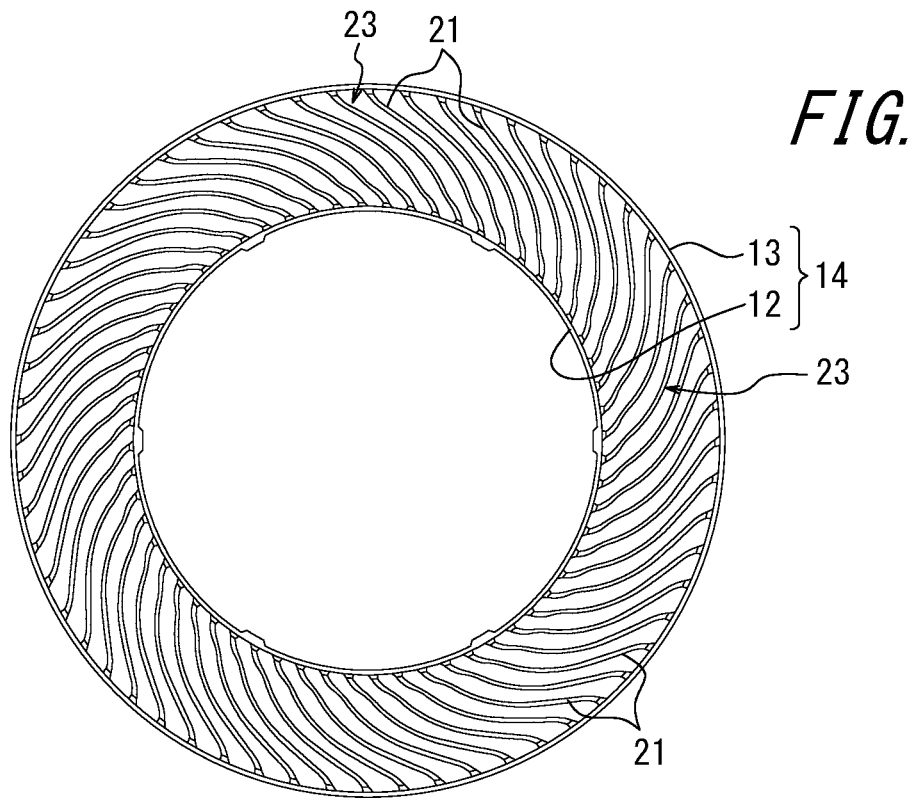
FIGS. 3A and 3B are respectively a front view and perspective view of the inner cylinder and outer cylinder connected by connecting members in another example.
Figure 3B:
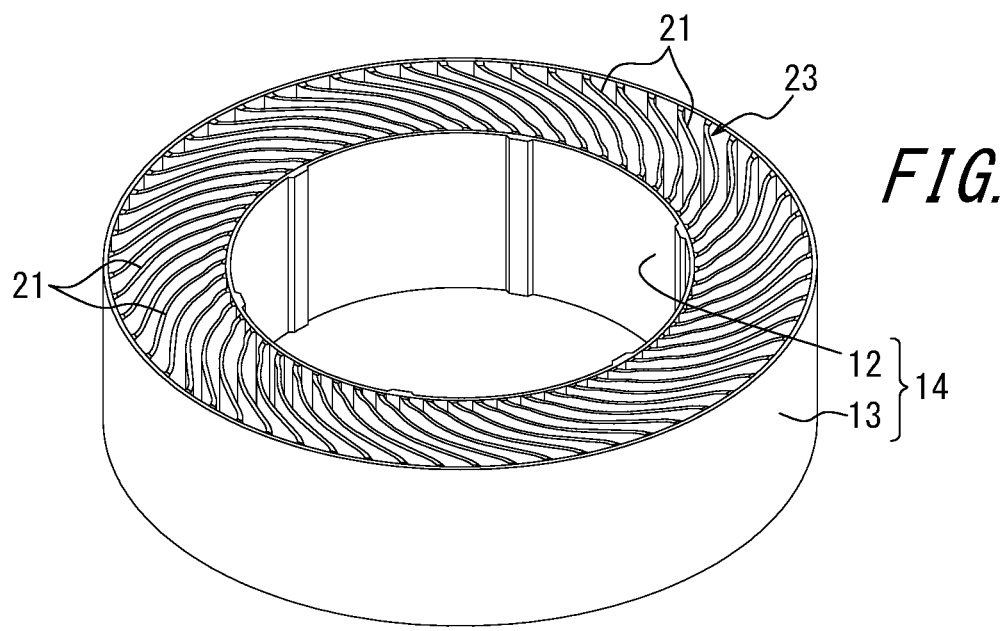

FIGS. 3A and 3B are respectively a front view and perspective view of the inner cylinder and outer cylinder connected by connecting members in another example. As illustrated in FIGS. 3A and 3B, each connecting member 23 includes only the first elastic connecting plate 21, unlike the connecting member 15 including the first elastic connecting plate 21 and the second elastic connecting plate 22. A plurality of first elastic connecting plates 21 each constituting a connecting member 23 are arranged along the tire circumferential direction between the inner cylinder 12 and the outer cylinder 13, and connect the cylinders 12 and 13 to each other. The other structures and functions are the same as those of the connecting members 15.

The description has focused on a non-pneumatic tire while referring to the drawings, but a tire of the present disclosure is not limited to being a non-pneumatic tire and may instead be a pneumatic tire.

For example, a pneumatic tire in which the framework member is made of a resin material can be formed by providing an inner cavity between the tread member 16 and the outer circumferential surface of the outer cylinder 13 of the ring member 14 in the non-pneumatic tire 10 illustrated in FIG. 1 and FIG. 2.

EXAMPLES

The present disclosure is described below in detail with reference to Examples. However, the present disclosure is no way limited to the following Examples.

(Resin Component of Resin Composition)

Resins 1 to 7 below were used as the resin component of the resin material (resin composition) forming the framework member of the tires in the Examples and the Comparative Examples.

Resin 1: polyamide 610 (PA610), produced by Arkema, product name "Hyprolon 70NN", Young's modulus at 23° C. of 2000 MPa, water absorption rate of 3.2 mass % after immersion in water for 2 weeks at 23° C.

Resin 2: polyamide 612 (PA612), produced by Arkema, product name "Hyprolon 90NN", Young's modulus at 23° C. of 1700 MPa, water absorption rate of 3.0 mass % after immersion in water for 2 weeks at 23° C.

Resin 3: polyamide 1010 (PA1010), produced by Arkema, product name "Hyprolon 200NN", Young's modulus at 23° C. of 1500 MPa, water absorption rate of 2.4 mass % after immersion in water for 2 weeks at 23° C.

Resin 4: polyamide 1012 (PA1012), produced by Arkema, product name "Hyprolon 400NN", Young's modulus at 23° C. of 1100 MPa, water absorption rate of 2.5 mass % after immersion in water for 2 weeks at 23° C.

Resin 5: polyamide 66 (PA66), produced by Asahi Kasei, product name "REONA 1300S", Young's modulus at 23° C. of 2700 MPa, water absorption rate of 8.1 mass % after immersion in water for 2 weeks at 23° C.

Resin 6: polyamide 6 (PA6), produced by Ube Industries, Ltd., product name "UBE Nylon 1013B", Young's modulus at 23° C. of 2600 MPa, water absorption rate of 8.9 mass % after immersion in water for 2 weeks at 23° C.

Resin 7: polyamide 12 (PA12), produced by Arkema, product name "Rilsamid AMNO TLD", Young's modulus at 23° C. of 1450 MPa, water absorption rate of 1.8 mass % after immersion in water for 2 weeks at 23° C.

(Flexible Component of Resin Composition)

Flexible components A to G below were used as the flexible component of the resin material (resin composition) forming the framework member of the tires in the Examples and the Comparative Examples.

Flexible component A: ethylene-methyl acrylate copolymer (EAR), produced by Japan Polyethylene Corporation, product name "Lexperl EMA EB050S", glass transition temperature (Tg) of −18° C., Young's modulus at 23° C. of 15 MPa, no modified group Flexible component B: ethylene-methyl acrylate copolymer (EAR), produced by Arkema, product name "Bondine AX8390", glass transition temperature (Tg) lower than −20° C., Young's modulus at 23° C. of 30 MPa, modified group=copolymerization with maleic anhydride (MAH-co)

Flexible component C: ethylene-methyl acrylate copolymer (EAR), produced by Arkema, product name "Lotader GMA AX8900", glass transition temperature (Tg) lower than −20° C., Young's modulus at 23° C. of 30 MPa, modified group=copolymerization with glycidyl methacrylate (GMA-co)

Flexible component D: poly α-olefin, produced by Sumitomo Chemical Co., Ltd., product name "TAFMER MH7020", glass transition temperature (Tg) lower than −50° C., Young's modulus at 23° C. of 40 MPa, modified group=graft of maleic anhydride (MAH-g)

Flexible component E: styrene-ethylene-butylene-styrene copolymer (SEBS), produced by Kraton, product name "FG1924", glass transition temperature (Tg) lower than −20° C., Young's modulus at 23° C. of 14 MPa, modified group=graft of maleic anhydride (MAH-g)

Flexible component F: polypropylene (PP), produced by SunAllomer, product name "PM940M", glass transition temperature (Tg) lower than 0° C., Young's modulus at 23° C. of 550 MPa, no modified group Flexible component G: low density polyethylene (LDPE), produced by Asahi Kasei, product name "Suntec LD M6545", glass transition temperature (Tg) lower than 0° C., Young's modulus at 23° C. of 120 MPa, no modified group Examples 1 to 12 and Comparative Examples 1 to 7

Non-pneumatic tires were produced as samples. The sample non-pneumatic tires each had a tire size of 155/65R13 and the structure illustrated in FIG. 1 and FIG. 2.

The sample non-pneumatic tires differed only in the material constituting the ring member and the connecting members (spoke structure). Other members were the same. The type and content of material included in the resin composition forming the ring member and connecting members are listed in Table 1.

Two of each sample non-pneumatic tire were prepared: (1) a tire kept for two weeks at 23° C. and 50% relative humidity (RH), and (2) a tire immersed in water for 2 weeks at 23° C. The following evaluation was then performed on the tires.

<Tire Durability (Durability Against Running Over Projections)>

Hemispheric projections 20 mm in diameter were attached to a drum endurance testing machine, a load of 650 N was applied to each sample in a 40° C. environment, and the running distance until failure when running at 50 km/h was measured to evaluate the tire durability. The resulting running distance of each sample tire is represented as an index value, with the running distance as 100 for the tire in Example 1, which was kept for two weeks at 23° C. and 50% RH. A larger index value represents higher durability of the tire.

ment in durability in a tire using a resin composition containing a flexible component with a glass transition temperature of 0° C. or less.

INDUSTRIAL APPLICABILITY

The present disclosure can provide a tire with excellent durability regardless of use in a high-humidity environment or contact with water, even though the framework member is made of a resin material. This tire can be used in various types of vehicles and is easy to recycle.

REFERENCE SIGNS LIST

10 Non-pneumatic tire
11 Attachment body
12 Inner cylinder
13 Outer cylinder
14 Ring member
15 Connecting member
16 Tread member
17 Holding cylindrical portion
18 Outer ring portion
19 Rib
21 First elastic connecting plate (connecting member)
21a End
21b Other end

TABLE 1

| | Resin Composition | | | | Tire Durability (Index) | |
|---|---|---|---|---|---|---|
| | Resin Component | | Flexible Component | | | |
| | type | content (mass %) | type | content (mass %) | 23° C./50% humidity/2 weeks | 23° C./immersed in water/2 weeks |
| Example 1 | resin 1 | 100 | — | — | 100 | 85 |
| Example 2 | resin 1 | 80 | flexible component A | 20 | 2015 | 1920 |
| Example 3 | resin 1 | 80 | flexible component B | 20 | 2570 | 2440 |
| Example 4 | resin 1 | 80 | flexible component C | 20 | 2680 | 2525 |
| Example 5 | resin 1 | 80 | flexible component D | 20 | 4992 | 4782 |
| Example 6 | resin 1 | 70 | flexible component D | 30 | 5621 | 5581 |
| Example 7 | resin 1 | 80 | flexible component E | 20 | 3041 | 2986 |
| Example 8 | resin 1 | 80 | flexible component F | 20 | 1370 | 1111 |
| Example 9 | resin 1 | 80 | flexible component G | 20 | 1764 | 1688 |
| Example 10 | resin 2 | 80 | flexible component D | 20 | 6243 | 6127 |
| Example 11 | resin 3 | 80 | flexible component D | 20 | 7654 | 7589 |
| Example 12 | resin 4 | 80 | flexible component D | 20 | 7824 | 7819 |
| Comparative Example 1 | resin 5 | 100 | — | — | 85 | 3 |
| Comparative Example 2 | resin 5 | 80 | flexible component D | 20 | 125 | 2 |
| Comparative Example 3 | resin 6 | 100 | — | — | 55 | 1 |
| Comparative Example 4 | resin 6 | 80 | flexible component D | 20 | 98 | 1 |
| Comparative Example 5 | resin 7 | 100 | — | — | 83 | 62 |
| Comparative Example 6 | resin 7 | 80 | flexible component D | 20 | 95 | 74 |
| Comparative Example 7 | resin 1 | 50 | flexible component D | 50 | 45 | 20 |

The results in Table 1 show that the tire of the Examples according to the present disclosure have excellent durability even in a high-humidity environment or when immersed in water. The results also show a further significant improve- 21*c* Intermediate portion
21*d*-21*f* Curved portion
22 Second elastic connecting plate (connecting member)
22*a* End
22*b* Other end
22*c* Intermediate portion
22*d*-22*f* Curved portion
23 Connecting member
25 Adhesion layer

The invention claimed is:

1. A tire comprising:

an attachment body to be attached to an axle;

a ring member including an inner cylinder externally covering the attachment body and an outer cylinder surrounding the inner cylinder from a tire radial outer side;

a plurality of connecting members arranged along a tire circumferential direction between the inner cylinder and the outer cylinder and connecting the inner cylinder and the outer cylinder to each other; and a tread member made of vulcanized rubber and located on the tire radial outer side of the outer cylinder of the ring member;

wherein the tire is a non-pneumatic tire, the ring member and the connecting members form a framework member and are made of a resin material;

wherein the resin material is made of a resin composition including 60 mass % or more of a polyamide resin formed by polymerizing an aliphatic diamine having 6 to 20 carbon atoms and an aliphatic dicarboxylic acid having 10 to 20 carbon atoms, and 40 mass % or less of a flexible component having a glass transition temperature of 0° C. or lower, the flexible component includes poly α-olefin, and maleic anhydride is copolymerized with or grafted onto at least a portion of the poly α-olefin.

* * * * *